(12) United States Patent
Diebel et al.

(10) Patent No.: US 9,776,798 B2
(45) Date of Patent: Oct. 3, 2017

(54) ASSEMBLY SET FOR A SLAT-BAND CONVEYOR

(71) Applicant: KABELSCHLEPP GMBH—HÜNSBORN, Wenden-Hünsborn (DE)

(72) Inventors: Michael Diebel, Dillenburg (DE); André Kleinhans, Haiger (DE)

(73) Assignee: Kabelschlepp GmbH—Hünsborn, Wenden-Hünsborn (DE)

( * ) Notice: Subject to any disclaimer, the term of this patent is extended or adjusted under 35 U.S.C. 154(b) by 35 days.

(21) Appl. No.: 14/434,616

(22) PCT Filed: Sep. 12, 2013

(86) PCT No.: PCT/EP2013/068904
§ 371 (c)(1),
(2) Date: Apr. 9, 2015

(87) PCT Pub. No.: WO2014/056669
PCT Pub. Date: Apr. 17, 2014

(65) Prior Publication Data
US 2016/0251162 A1    Sep. 1, 2016

(30) Foreign Application Priority Data

Oct. 11, 2012    (DE) .................... 10 2012 109 696

(51) Int. Cl.
*B65G 17/10* (2006.01)
*B65G 17/06* (2006.01)
*B65G 17/38* (2006.01)

(52) U.S. Cl.
CPC ........ *B65G 17/063* (2013.01); *B65G 17/067* (2013.01); *B65G 17/38* (2013.01)

(58) Field of Classification Search
CPC ..... B65G 17/38; B65G 17/063; B65G 17/067
USPC .................................................. 198/822, 845
See application file for complete search history.

(56) References Cited

U.S. PATENT DOCUMENTS

| | | | | |
|---|---|---|---|---|
| 2,950,000 | A * | 8/1960 | Rivers | B65G 17/10 198/822 |
| 3,233,722 | A * | 2/1966 | Jorgensen | B65G 17/067 198/822 |
| 3,554,361 | A * | 1/1971 | Keough | B65G 17/067 198/820 |
| 3,841,829 | A * | 10/1974 | Korting | F23H 11/00 110/269 |
| 3,866,743 | A | 2/1975 | Jorgensen | |
| 4,473,151 | A * | 9/1984 | Kumferman | B65G 17/10 198/822 |
| 4,909,381 | A * | 3/1990 | Stohr | B65G 17/067 198/822 |

(Continued)

FOREIGN PATENT DOCUMENTS

| | | |
|---|---|---|
| DE | 8915287 U1 | 3/1990 |
| DE | 29505477 U1 | 6/1995 |

(Continued)

*Primary Examiner* — William R Harp
(74) *Attorney, Agent, or Firm* — BainwoodHuang

(57) ABSTRACT

Disclosed is an assembly set for a slat-band conveyor including lateral rims which are formed by two lateral parts, the lateral rims being hinged together, and including plates which are connected to the lateral rims. The lateral parts have substantially the same geometry.

13 Claims, 3 Drawing Sheets

(56) References Cited

U.S. PATENT DOCUMENTS 4,932,515 A * 6/1990 Stohr .................. B65G 17/067
198/822
6,412,429 B2 * 7/2002 Foresman ............... F23H 11/18
110/327

FOREIGN PATENT DOCUMENTS

| DE | 60218168 T2 | 11/2007 |
|----|-------------|---------|
| EP | 1857383 A2 | 11/2007 |
| WO | 0171254 A1 | 9/2001 |
| WO | 2010021116 A1 | 2/2010 |

* cited by examiner

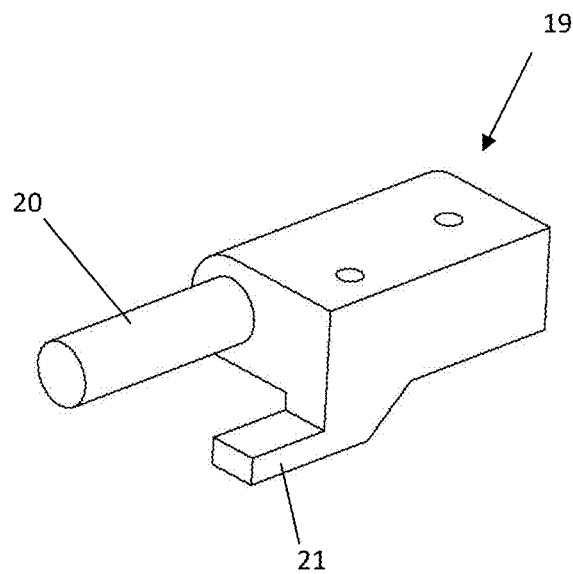
Fig. 6
Fig. 7
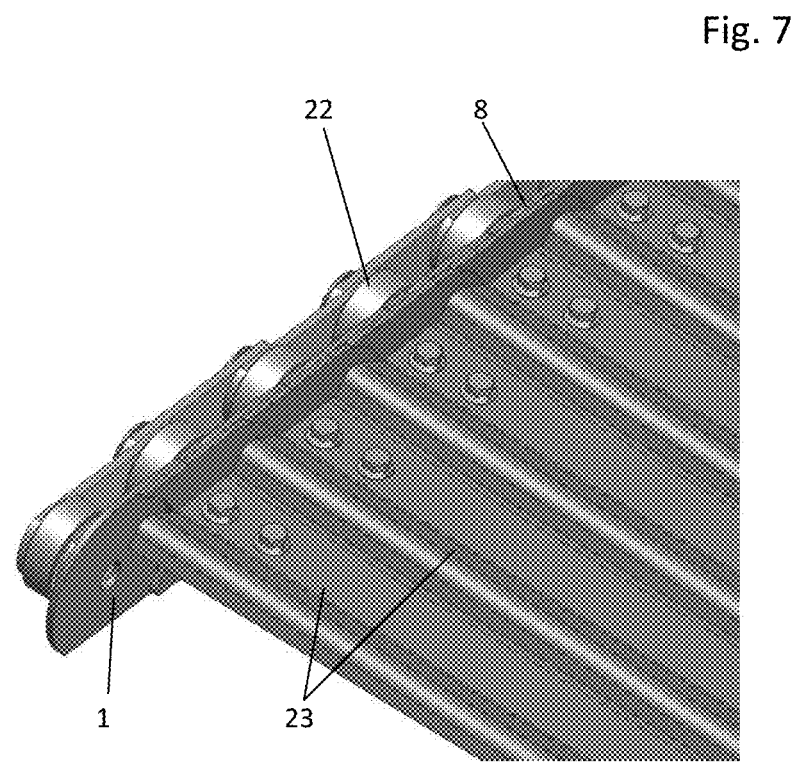

ASSEMBLY SET FOR A SLAT-BAND CONVEYOR

BACKGROUND

The subject matter of the invention relates to a kit for a hinged-belt conveyor, preferably for metal wastes, such as chips or the like.

Hinged-belt conveyors for the removal of metal wastes, such as chips or the like, are known. They are used for metalworking machines in order to convey metal wastes such as chips or the like into a collecting vessel or to transport them away from the metalworking machine.

A hinged-belt conveyor has a conveyor belt that is embodied in the form of an endless belt. The conveyor belt is formed by plates which are preferably made of wear-resistant steel sheets that are interconnected in an articulated manner.

A hinged-belt conveyor is known from EP 1 857 383 A2 which has specially structured plates. Through the structure of the plates, it is ensured that substantially no gap is present between the plates into which wastes, particularly metal wastes such as chips or the like can get as a result of which the wear of the plates in the joint area would be increased.

SUMMARY

Taking this prior art as a point of departure, it is the object of the present invention to provide a kit for a hinged-belt conveyor which simplifies the construction of the hinged-belt conveyor.

The stated object is achieved according to the inventions by the features disclosed herein. Advantageous developments are described herein. The features listed individually herein can be combined with each other in any technologically sensible manner and can be supplemented by explanatory facts from the description, with additional embodiments of the invention being indicated.

The kit according to the invention for a hinged-belt conveyor comprises side flanges that are formed by two side parts. The side flanges are interconnected in an articulated manner. Plates are connected to the side flanges. The side parts of the flanges have substantially the same geometry. By virtue of the kit according to the invention, the formation of a hinged-belt conveyors is simplified. Particularly, as a result of the invention, the number of the components required to form the hinged-belt conveyor is greatly reduced. The advantage of the invention can also be regarded as being that a simplified exchanging of the side flanges and side parts is made possible, since only one side part is used regardless of where on the articulatedly interconnected side flanges the side part is to be exchanged.

The side flanges comprise two side parts abutting tightly against one another that can also be referred to as an inner part and an outer part. In particular, it is proposed that the side parts have a first end area and a second end area, the contour of the end areas being embodied such that they engage in each other. If a side flange is constructed of such side parts, and the side flanges are connected to each other, then the gap between the inside side parts and the gap between the outside side parts of the side flanges is substantially minimized. This offers the advantage that the inside and the outside side parts of the side flanges form a substantially closed wall surface of the side flanges. This substantially closed surface of the side flanges has the advantage that the transported material cannot get into the gap or abutting edges, impairing the kinematics of the side flanges. Furthermore, this offers the advantage that the transported material cannot get into the jointed area, damaging the joints by means of which the side flanges are interconnected.

An embodiment of the side parts is especially preferred in which the first end area has a substantially arched contour. The second end area also has a substantially arched contour, it being possible to refer to one arched contour as a convex contour and the other arched contour as a concave contour.

According to yet another advantageous embodiment of the kit, it is proposed that the side part have a joint bore. The arrangement of the joint bore on the side part is selected such that, during formation of the side flanges, the division remains intact.

It is especially advantageous for the formation of the hinged-belt conveyor if at least one holder is provided. The holder can be connected to a side part and a plate. This enables yet another simplification of the construction of the hinged-belt conveyor. The holder can be adapted to the plate and/or the side part, but this is not absolutely necessary. A holder can be connected to differently embodied plates. The holder constitutes a standardized component that can be used for hinged-belt conveyors with different conveyor belts.

To simplify assembly and to simplify the replacement of the side flange or of a side part, it is proposed that the holder have a passage through which a joint bolt can extend. The joint bolt is used not only to interconnect the side flanges but also to connect the holder to a side part.

To reduce the number of components, it is proposed that the holder and the joint bolt form a structural unit. The joint bolt can be connected to the holder in a positive and/or nonpositive manner.

According to yet another advantageous embodiment of the kit, it is proposed that the holder have positioning means that cooperate with the side part. This has the advantage that a defined installed position of the holder is achieved. The positioning means can also be used to fix the holder to the side part, thus achieving simplified assembly.

According to yet another advantageous embodiment of the kit, it is proposed that at least several side flanges be connected to at least one drive means. The drive means is preferably a joint chain. The connection of the side flanges to the joint chain is preferably done via the joint bolt.

The side parts are preferably embodied as punched parts. This simplifies the manufacture of the side parts.

BRIEF DESCRIPTION OF THE SEVERAL VIEWS OF THE DRAWINGS

Additional advantages and details of the kit according to the invention for a hinged-belt conveyor will be explained on the basis of the exemplary embodiment depicted in the drawing without limiting the subject matter of the invention to this specific exemplary embodiment. In the drawings:

FIG. 6: shows an exemplary embodiment of a holder, and FIG. 7: shows a hinged-belt conveyor.

DETAILED DESCRIPTION OF THE INVENTION

Figure 1:
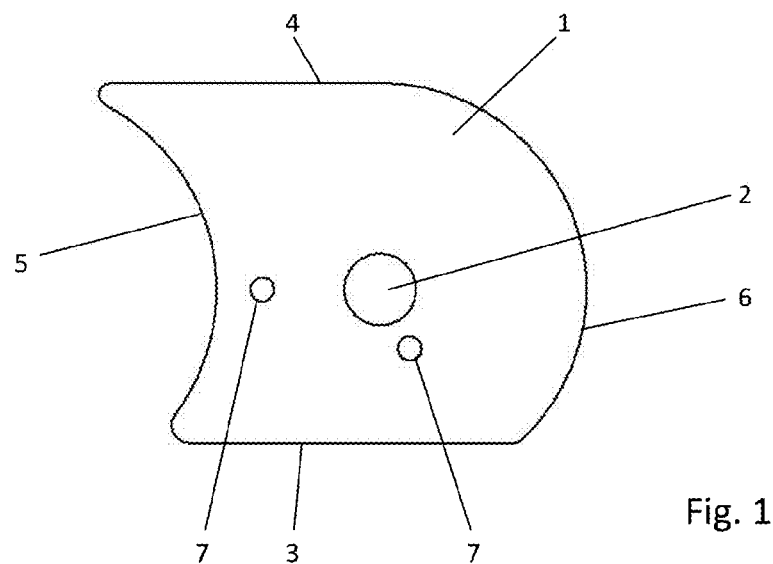
FIG. 1: shows a first exemplary embodiment of a side part.

FIG. 1 shows a first exemplary embodiment of a side part 1. The side part 1 is a sheet metal part that was preferably manufactured as a punched part. The side part 1 has a lower edge 3 which can slide, for example, on a corresponding support. Optionally, the lower edge 3 is provided with lubricants, particularly with a lubricated coating or at least one sliding shoe in order to reduce frictional losses during movement of the hinged-belt conveyor. An upper edge 4 is provided parallel to the lower edge 3.

The side part has a first end area 5 and a second end area 6. The end areas 5, 6 have a contour that is substantially arched. The contour of the first end area is concave. The second end area 6 has a convex arched contour. The radii of the contours are substantially equal.

Reference symbol 7 refers to a positioning means constituted by bores, for example. The positioning means 7 is arranged symmetrically with respect to the longitudinal axis of the side part 1, so that a predetermined possibility for the assembly of the side part 1 with a holder is ensured.

Figure 2:
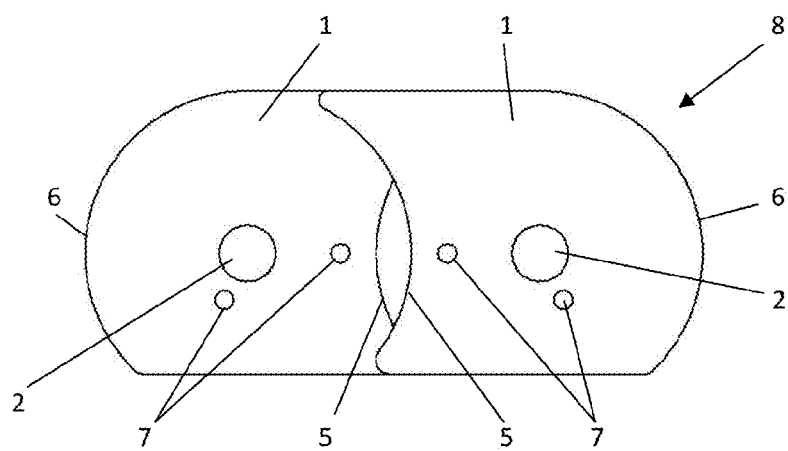
FIG. 2: shows a side flange formed by two side parts according to FIG. 1 in a front view.

FIG. 2 shows a side flange of a hinged-belt conveyor. The side flange 8 is formed by two side parts 1 that are arranged so as to abut against one another. The second end areas 6 simultaneously form the end areas of the side flange 8. Two side parts 1 are produced through the commensurate assembly or through the rotation of a side part 1 about a transverse axis. The joint bores 2 are connected to a drive chain (not shown).

Figure 3:
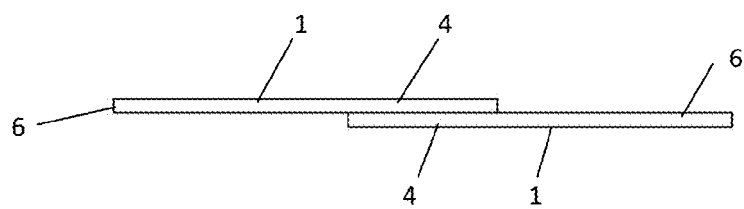
FIG. 3: shows the side flange according to FIG. 2 in a top view.

FIG. 3 shows the side flange 8 in a top view. If several side flanges are interconnected, they form a substantially continuous upper edge as well as a substantially continuous rear edge. The presence of a substantially continuous upper edge ensures that no transported material can get between two articulatedly interconnected side flanges.

Figure 4:
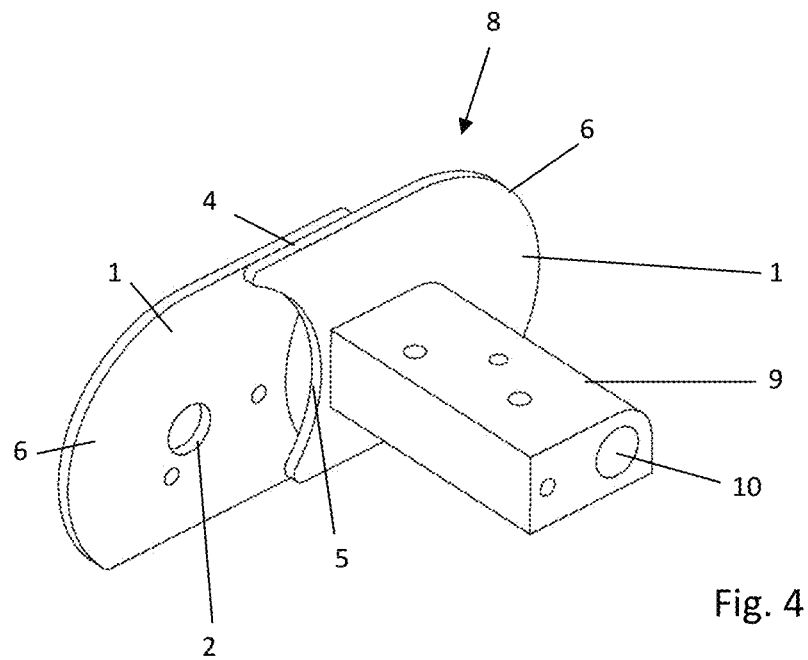
FIG. 4: shows the side flange with a holder in a perspective view.

FIG. 4 shows a side flange 8 with a holder 9. The holder 9 preferably has projections (not shown) which engage in the positioning means of the side part 1. Through the combination of positioning means and projections, a defined assembly situation of the holder 9 with the side part 1 is achieved. As can be seen from the illustration according to FIG. 4, the holder 9 has a passage 10. The passage 10 has a circular cross section and is embodied coaxially to the joint bore 2. A joint bolt (not shown) can be inserted into the passage 10. It extends through the side part 1 of the side flange and of the second side part (not shown), thus achieving an articulated connection of two side flanges. A corresponding holder 9 can be provided on the other side part 1. The holder 9 is used for connection to a plate, which is not shown in FIG. 4.

Figure 5:
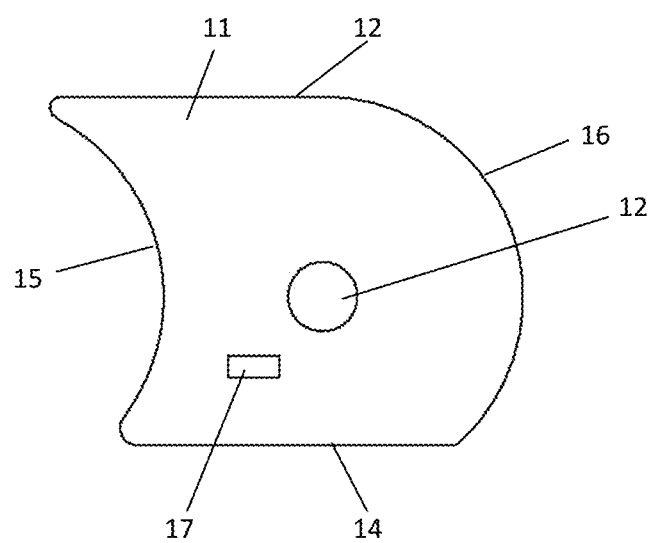
FIG. 5: shows a second exemplary embodiment of a side part.

FIG. 5 shows a second exemplary embodiment of a side part 11. The side part 11 also has a joint bore 12. The side part 11 has a lower edge 13 and an upper edge 14 running parallel thereto. It can be seen from FIG. 5 that the side part 11 has a first end area 15 that has a concave curvature and, furthermore, a second end area 16 having a convex curvature. The curvature radii of the areas 15, 16 are preferably equal.

Reference symbol 17 refers to a substantially rectangular positioning means. The positioning means 17 is a punch-out from the side part 11 manufactured as a punched part from a metal sheet.

FIG. 6 shows a holder 19. The holder 19 has a joint bolt whose cross section is adapted to the joint bore 12. The holder 19 also has a nose 21 that is embodied such that it fits into a positioning means embodied as a recess 17. Through the positioning means 17 and the nose 21, a defined installed position of the holder 19 is achieved. Moreover, the nose 21 and the recess 17 can absorb torques around the joint axis that passes through the joint bore 12 and the joint bolt 20.

FIG. 7 shows an exemplary embodiment of a hinged-belt conveyor in a sectional view. A joint chain 22 is provided. The joint chain is connected to side flanges 8. In particular, joint bolts extend to the rollers of the joint chain 22 through the side parts 1 of the side flanges 8. Plates 23 are connected to the side flanges 8. A transported material is conveyed by means of the plates 23.

The kit according to the invention for a hinged-belt conveyor enables simple assembly and a simple construction of a hinged-belt conveyor. Particularly, the exchanging of a side part or of a side flange can be done with relative ease.

It is also possible to provide a multistrand hinged-belt conveyor. In a two-strand hinged-belt conveyor, the middle side flange strand would be provided, and holders would be provided both to the right and to the left of the side flanges, so that plates would be present both to the right and to the left of the middle side flange strand.

LIST OF REFERENCE SYMBOLS

1 side part
2 joint bore
3 lower edge
4 upper edge
5 first end area
6 second end area
7 positioning means
8 side flange
9 holder
10 passage
11 side part
12 joint bore
13 lower edge
14 upper edge
15 first end area
16 second end area
17 positioning means
18
19 holder
20 joint bolt
21 projection
22 joint chain
23 plate

The invention claimed is:

1. Kit for a hinged-belt conveyor, the kit comprising side flanges that are formed by two side parts, the side flanges being interconnected in an articulated manner and connected to plates that are connected to side flanges, wherein the side parts have substantially the same geometry, wherein each of the side parts has a convex end area and a concave end area, and wherein the two side parts of each of the side flanges overlap with the concave end area of one side part overlapping the convex end area of the other side part.

2. Kit as set forth in claim 1, wherein the convex end area of one side part of a first side flange engages in the concave end area of a side part of a second side flange.

3. Kit as set forth in claim 1, wherein each side part has a joint bore.

4. Kit as set forth in claim 1, wherein there is at least one holder that can be connected to a side part and a plate.

5. Kit as set forth in claim 4, wherein the holder has a passage through which a joint bolt can be passed.

6. Kit as set forth in claim 4, wherein the holder has a joint bolt.

7. Kit as set forth in claim 4, wherein the holder has a positioning means that cooperates with the side part.

8. Kit as set forth in claim 1 wherein at least several side flanges are connected to at least one drive means.

9. Kit as set forth in claim 1 wherein each side part is substantially a punched part.

10. Kit as set forth in claim 1,
wherein the two side parts of a side flange are provided as a first side part and a second side part,
wherein the first side part is attached to a first conveyor plate via a first holder that prevents rotation of the first conveyor plate relative to the first side part,
wherein the second side part is attached to a second conveyor plate via a second holder that prevents rotation of the second conveyor plate relative to the second side part, and
wherein the first conveyor plate is connected to the second conveyor plate through a hinged region such that rotation of the first conveyor plate relative to the second conveyor plate causes the two side parts of the side flange to articulate relative to each other.

11. A hinged-belt conveyor, comprising:
multiple side parts, each side part having a concave first end and a convex second end, the side parts arranged end-to-end in an overlapping manner such that the concave first end of each side part overlaps with a concave first end of another side part and such that the convex second end of each side part overlaps with a convex second end of another side part; and
multiple conveyor plates of a conveyor belt, each conveyor plate attached to a respective side part in a manner that prevents rotation of the conveyor plate relative to the side part to which it is attached.

12. The hinged-belt conveyor as set forth in claim 11, wherein the side parts form two rows of side parts, (i) a first row with side parts arranged end-to-end with the convex second ends pointing in a first direction and (ii) a second row with side parts arranged end-to-end with the convex second ends pointing in a second direction opposite the first direction.

13. The hinged-belt conveyor as set forth in claim 12, wherein each side part is connected to a respective conveyor plate via a respective holder attached to both the side part and the respective conveyor plate.

\* \* \* \* \*